UNITED STATES PATENT OFFICE.

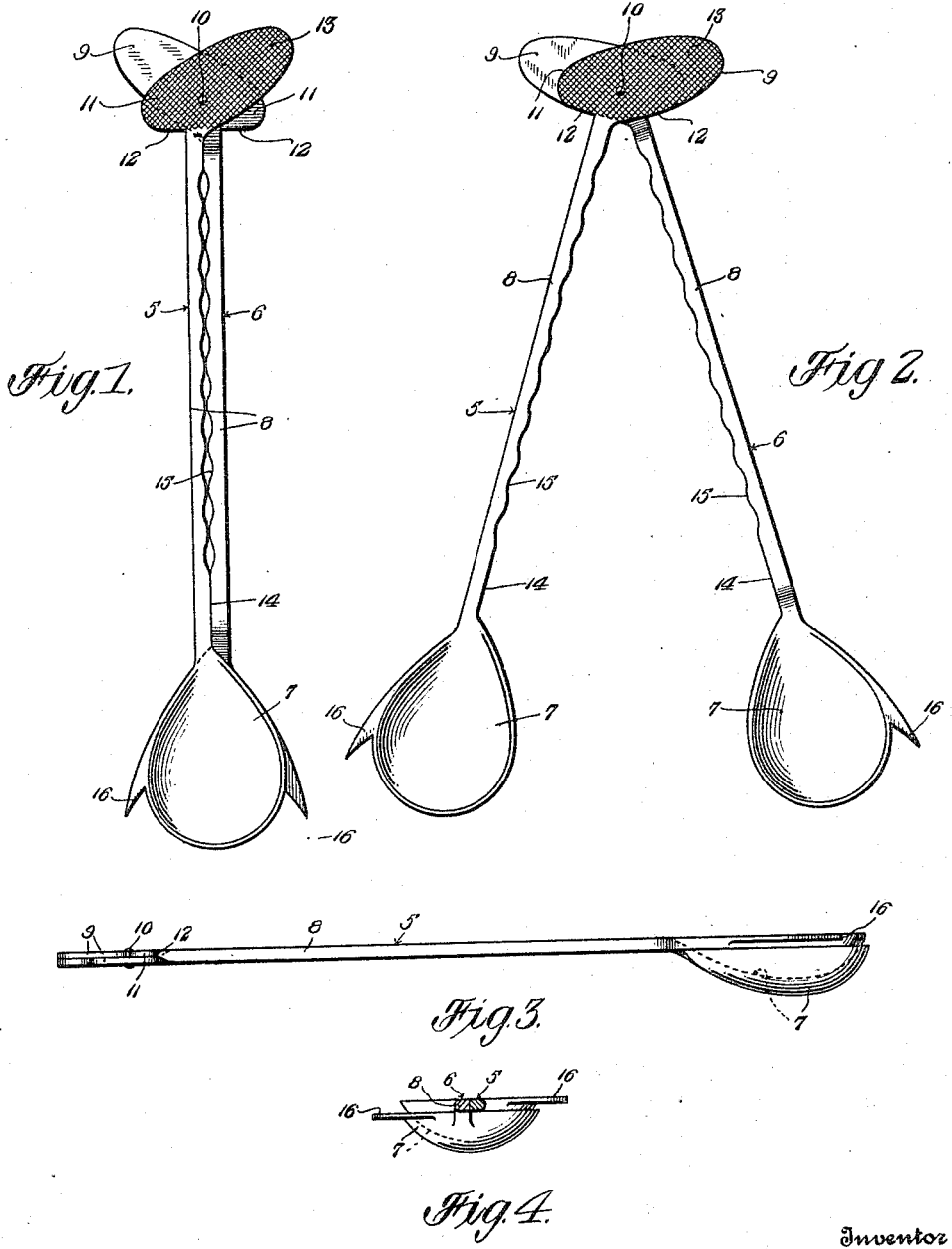

JAMES EDWARD MALLOY, OF MONTPELIER, VERMONT.

DOUBLE MIXING-SPOON.

1,192,659.  Specification of Letters Patent.  Patented July 25, 1916.

Application filed April 2, 1915. Serial No. 18,788.

*To all whom it may concern:*

Be it known that I, JAMES E. MALLOY, a citizen of the United States, residing at Montpelier, in the county of Washington and State of Vermont, have invented new and useful Improvements in Double Mixing-Spoons, of which the following is a specification.

The present invention contemplates the provision of a spoon designed to stir or mix two separate drinks at the same time, the device being primarily intended for use in bar rooms, cafés, drug stores and like places.

I further aim to provide a spoon of this character wherein the bowl portion thereof is formed with a finger to permit use of the device in the capacity of a fork to place cherries, olives or like fruit in certain kinds of drinks, thus eliminating the use of the fingers for such purposes which is highly objectionable from a sanitary point of view.

Other objects will appear as the nature of the invention is better understood, the same residing in the combination, construction and arrangement of parts hereinafter more fully set forth.

In the drawing forming part of this application, like numerals of reference indicate similar parts in the several views and wherein:—

Figure 1 is a front elevation of the spoon showing the normal position of the members. Fig. 2 is a similar view with the members spread apart. Fig. 3 is a side elevation. Fig. 4 is a sectional elevation taken in a plane transverse of the handles.

In the preferred embodiment of the invention as illustrated, the spoon comprises two pivotally connected members 5 and 6 respectively. Each of said members include a bowl portion 7, and a handle 8, the latter preferably being of circular outline in cross section. The handles 8 are formed at their upper ends with oppositely projecting angularly disposed flat portions 9 of oval outline, which are arranged in superimposed relation and pivotally connected as at 10 in any suitable manner. The portions 9 are designed for manipulating the device in the manner presently described. The formation of the portions 9 on each handle provides an offset 11 whose lower edge 12 projects from the outer edge of the handle at a substantially right angle thereto, and adapted to be engaged by the fingers of the user of the spoon for spreading the members 5 and 6 respectively, by pressing upwardly upon the offset portions 11 as will be readily understood. Each of the portions 9 is roughened on one side as at 13 and adapted to be engaged by the free ends of the fingers to prevent slipping or dropping of the spoon. It will be observed that one of the handles 8 is offset relative to the portion 9 and the bowl 7 thereof, so that in the normal position of parts the bowl 7 of one member will be received within the bowl portion of the other, and at the same time dispose the adjacent edges 14 of the handles in alinement and contacting engagement with each other. The swinging movements of the members 5 and 6 will thus be limited in one direction. The edges 14 of the handles are corrugated as at 15 to effectively grip a half lemon or like fruit therebetween to permit the device when desired, to be used in the capacity of a lemon squeezer as will be readily understood.

The outer edge of the bowl portion 7 of each member is formed with a forwardly projecting finger 16 terminating in a point to permit the spoon to be used in the capacity of a fork for placing cherries, olives or the like in certain kinds of drinks, thereby doing away with the use of the fingers; the customary way of performing this duty at present which is highly objectionable from a sanitary point of view. It will of course be understood, that in mixing a single drink the members 5 and 6 maintain their relative position shown in Fig. 1, and when mixing two drinks the members are spread in the manner hereinabove specifically described, and the bowl portion of each member inserted in the separate glasses arranged side by side.

The invention provides an exceptionally convenient article, especially for those employed in places where a number of different kinds of drinks are constantly being prepared, and time a matter of importance.

It is believed that from the foregoing description the nature and advantages of the invention will be readily understood without requiring a more extended explanation and therefore the same has been omitted. However I desire to have it understood that I do not limit myself to the precise construction and arrangement of parts herein shown and described as the same are merely illustrative, and that various changes may be resorted to when desired as fall within the scope of the appended claims.

What is claimed is:—

1. A device of the class described comprising a pair of normally overlapping members, a shank for each of said members, a manipulating member on the outermost end of each shank, said manipulating members being pivoted together in overlapping relation, and disposed at an angle with respect to their respective shanks, the extremities of both members extending beyond the opposite sides of the adjacent member, whereby the lowermost corresponding extremities of said members are adapted to be engaged and moved in opposite directions to spread the said normally overlapping members.

2. A device of the class described comprising a pair of normally overlapping members, a shank for each of said members, a manipulating member on the outermost end of each shank, said manipulating members being pivoted together in overlapping relation and disposed at an angle with respect to their respective shanks, the extremities of both members extending beyond the opposite sides of the adjacent member, whereby the lowermost corresponding extremities of said members are adapted to engage and move in opposite directions to spread the said normally overlapping members, and one of said shanks being offset with relation to its associated members, whereby the adjacent longitudinal edges of said shanks are normally disposed in contacting engagement.

In testimony whereof I affix my signature in presence of two witnesses.

JAMES EDWARD MALLOY.

Witnesses:
ALICE M. MCKINSTRY,
KATHERINE R. BURGAN.

Copies of this patent may be obtained for five cents each, by addressing the "Commissioner of Patents, Washington, D. C."